United States Patent [19]

Senuma et al.

[11] 4,364,654

[45] Dec. 21, 1982

[54] ELECTROMAGNETIC RELEASE SHUTTER

[75] Inventors: Michio Senuma, Tokyo; Fumio Shimada, Kawasaki; Yoshihiro Shigeta, Tokyo; Syuichiro Saito; Hiroshi Aizawa, both of Kawasaki; Takehiko Ohniwa, Chichibu, all of Japan; Canon Denshi Kabushiki Kaisha, 03, Saitama, both of Japan

[73] Assignee: Canon Kabushiki Kaisha, Tokyo

[21] Appl. No.: 279,258

[22] Filed: Jul. 1, 1981

[30] Foreign Application Priority Data

Jul. 7, 1980 [JP] Japan .................................. 55-92888

[51] Int. Cl.³ ............................ G03B 9/08; G03B 9/40
[52] U.S. Cl. ...................................... 354/234; 354/246
[58] Field of Search ................ 354/234, 235, 245–249

[56] References Cited

U.S. PATENT DOCUMENTS

| 3,946,414 | 3/1976 | Kitai | 354/245 X |
| 3,950,772 | 4/1976 | Nakagawa et al. | 354/234 |
| 3,999,196 | 12/1976 | Inoue | 354/249 X |
| 4,110,772 | 8/1978 | Nakagawa et al. | 354/252 X |

Primary Examiner—Donald A. Griffin
Attorney, Agent, or Firm—Toren, McGeady & Stanger

[57] ABSTRACT

In a shutter of the electromagnetic release type arranged to have shutter blades locked by locking members in their charged states and to make an exposure by releasing the shutter blades from the locking members, a first locking member is arranged to lock each of the charged shutter blades while a second locking member is arranged to lock the shutter blade when the shutter blade is released from the first locking member and to have the shutter blade released therefrom by the action of an electromagnet. The releasing torque required for the second locking member is smaller than that of the first locking member.

10 Claims, 2 Drawing Figures

ELECTROMAGNETIC RELEASE SHUTTER

BACKGROUND OF THE INVENTION

1. Field of the Invention

This invention relates to an electromagnetic release shutter and more particularly to an improvement in the locking mechanism of the shutter arranged to lock it in a charged state when it is charged into an initial position thereof.

2. Description of the Prior Art

The locking mechanism of an electromagnetic release type shutter in general has locking members which are arranged to accumulate the energy of shutter blade driving springs in response to a shutter charging action and to lock the driving springs as well as releasing mechanisms which are arranged to release the driving springs from their locked states by operating the locking members through the actions of electromagnets. To obtain stable precision of an electromagnetic release shutter of this type, it has been considered necessary to arrange the locking members, etc. to reduce the releasing torque required so that the locking effected by the locking members can be removed by a force as light as possible. Such an arrangement on the other hand tends to unintentionally have the shutter unlocked causing the shutter blades to travel as the result of a shock inflicted thereon, for example while the camera for which the shutter is used is carried. Therefore, in order to prevent such undesirable occurrences for reliable shutter operations, the torque required for release from locking members must be set to be higher than a certain minimum value.

Accordingly, there has been a limit to the degree of reduction of the releasing torque for the locking members used in the conventional electromagnetic release type shutters. Since some safety allowance must be additionally taken into consideration in determining the releasing torque for the locking members and the locking mechanism, it has been impossible to obtain stable precision of shutters. This has caused many inconveniences in the practical applications of the conventionally known arrangement. Further, in order to cope with the additional portion in the releasing torque of the locking members and the locking mechanism, the conventional electromagnetic release type shutters have necessitated either an increase in the size of electromagnets to be used for operating the locking members or an increase in the operating forces of the electromagnets by supplying a larger current thereto. This has resulted in increase in the size of the shutter.

SUMMARY OF THE INVENTION

The present invention is directed to the solution of the above stated problems presented by the conventional electromagnetic release type shutters.

It is therefore an object of the invention to provide an improved electromagnetically driven shutter which can be stably locked in a charged state.

It is another object of the invention to provide an electromagnetically driven shutter which is releasable from a locked state with a small amount of energy.

The shutter according to the invention has a locking mechanism consisting of two locking members. The first of the locking members is arranged to require a larger releasing torque than the second one. Each shutter blade is firmly locked by the first locking member when the shutter is in a charged state. Then, when the shutter is released from the first locking member by a shutter release operation, the shutter blade comes to be locked by the second locking member which requires a smaller releasing torque. The second locking member is then operated by an electromagnet to allow the shutter blade to travel. This arrangement according to the invention effectively prevents shutter blades from being caused to travel due to shock inflicted thereon while the camera is being carried and gives stable precision of the shutter. Further, the invented arrangement not only permits reduction in the size of the electromagnet to be used for the locking member but also permits it to be of a power saving type.

These and further objects, features and advantages of the invention will become apparent from the following detailed description of an embodiment thereof taken in connection with the accompanying drawings.

DETAILED DESCRIPTION OF A PREFERRED EMBODIMENT

Figure 1:
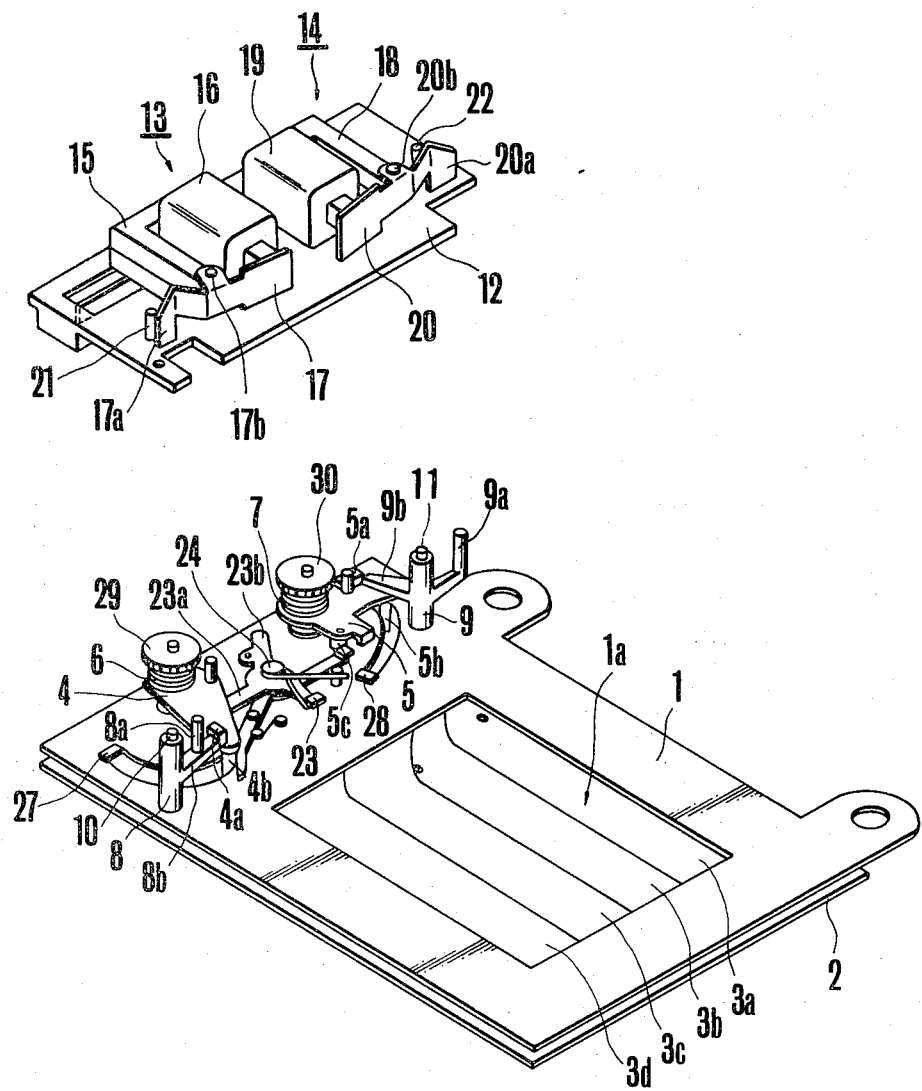
FIG. 1 is an oblique view showing the essential parts of an electromagnetic release type shutter as an embodiment of the present invention.

In the embodiment of the invention shown in FIG. 1, which shows the essential parts thereof, a shutter base plate 1 is provided with an exposure window 1a in the middle part thereof. A cover plate 2 is disposed at a given distance from the shutter base plate 1 and is also provided with an exposure window (not shown) in a place corresponding to the exposure window 1a. Between the shutter base plate 1 and the cover plate 2, there are provided front and rear shutter blades which are arranged to open and close the exposure window 1a through the operation of a known link mechanism. The front shutter blade is composed of divided blades 3a, 3b, 3c and 3d. The rear blade is also composed of divided blades which are located behind the shutter base plate 1 and thus are not shown in this drawing. To reduce the amount of moving mass, the divided blades of the front and rear blades are made from either a titanium material or a plastic material, or the like.

A front blade driving lever 4 is urged to rotate clockwise by a front blade driving spring 6 the urging force of which is arranged to be adjustable by means of a ratchet gear 29. A protrudent part 4a is provided at the upper part of the fore end of the lever 4. Meanwhile, the lower part of the fore end of the lever 4 is provided with a front blade driving pin 4b, which is arranged to cause a front blade driving arm (not shown) to move accordingly as the front blade driving lever 4 rotates. The front blade driving lever 4 is also made from a plastic material or the like in the same manner as the divided blades 3a, 3b, 3c and 3d for reduction in the moving mass. A second locking member 8 is arranged to lock the front shutter blade and is rotatably fitted on a supporting shaft 10 which is secured to the shutter base plate 1. The tip of a protrudent portion 8b of the second locking member 8 for the front shutter blade is caused to engage the protrudent portion 4a of the front blade driving lever 4 when the shutter is in a charged state. With the protrudent portion 8b of the second locking member 8 engaging the protrudent portion 4a of the front blade driving lever 4, the front shutter blade is restrained from travelling. A release signal pin is secured to the above stated protrudent portion 8b.

A lever 5 is provided for driving the rear shutter blade. The rear blade driving lever 5 has a protrudent portion 5a and a rear blade driving pin 5b which is arranged to actuate a rear blade driving arm which is not shown. Further, the rear blade driving lever is urged to rotate clockwise by a rear blade driving spring 7, which has its urging force adjustable by means of a ratchet gear 30. The structural arrangement of the rear blade driving lever is identical with that of the front blade driving lever 4. A supporting shaft 11 is secured to the shutter base plate 1 and is arranged to support a base plate 12 of a control part. A second locking member 9 which is arranged to lock the rear blade is rotatably fitted on the supporting shaft 11. The second locking member 9 for the rear blade is provided with a release signal pin 9a and a protrudent portion 9b which is arranged to engage the protrudent portion 5a of the rear blade driving lever 5. A brake member 27 for the front blade is arranged to stop without fail the front blade driving lever 4 from moving by applying a braking force to the front blade driving pin 4b of the front blade driving lever 4. Meanwhile, a brake member 28 for the rear blade is arranged to stop the rear blade driving lever 5 from moving in the same manner as the front blade brake member 27.

There are provided an electromagnet 13 for controlling the front shutter blade and another electromagnet 14 which is for controlling the rear blade. Both of them are of the attraction type and are arranged symmetrically as shown in the drawing in such a manner as to offset any positional difference caused by the influence of gravitation. Yokes 15 and 18 respectively have coils 16 and 19 wound thereabout. Armatures 17 and 20 are pivotally mounted on supporting pins 17b and 20b provided at ends of the yokes 15 and 18. Meanwhile, work portions 17a and 20a of the armatures are formed at the ends opposite to the ends having attraction faces. The armature 17 is urged to rotate clockwise as viewed on the illustration of the drawing by a spring which is not shown. The rotation of the armature 17 is arranged to be restricted at a point where the work portion 17a thereof comes to abut on a pin 21 provided on the control part base plate 12. When the coil 16 is energized to have the armature 17 attracted by the yoke 15, the work portion 17a moves to a predetermined extent and then comes to abut on the release signal pin 8a of the second locking member 8 for the front blade. The pin 8a is thus arranged to be pushed by the work portion 17a of the armature 17. The armature 20 is arranged also in the same manner as the armature 17. When the coil 19 is energized, the armature 20 comes to rotate to a predetermined extent against the force of a spring which is not shown. Then, the work portion 20a of the armature 20 comes to abut on the release signal pin 9a of the second locking member 9 for the rear blade and thus pushes the pin 9a.

Figure 2:
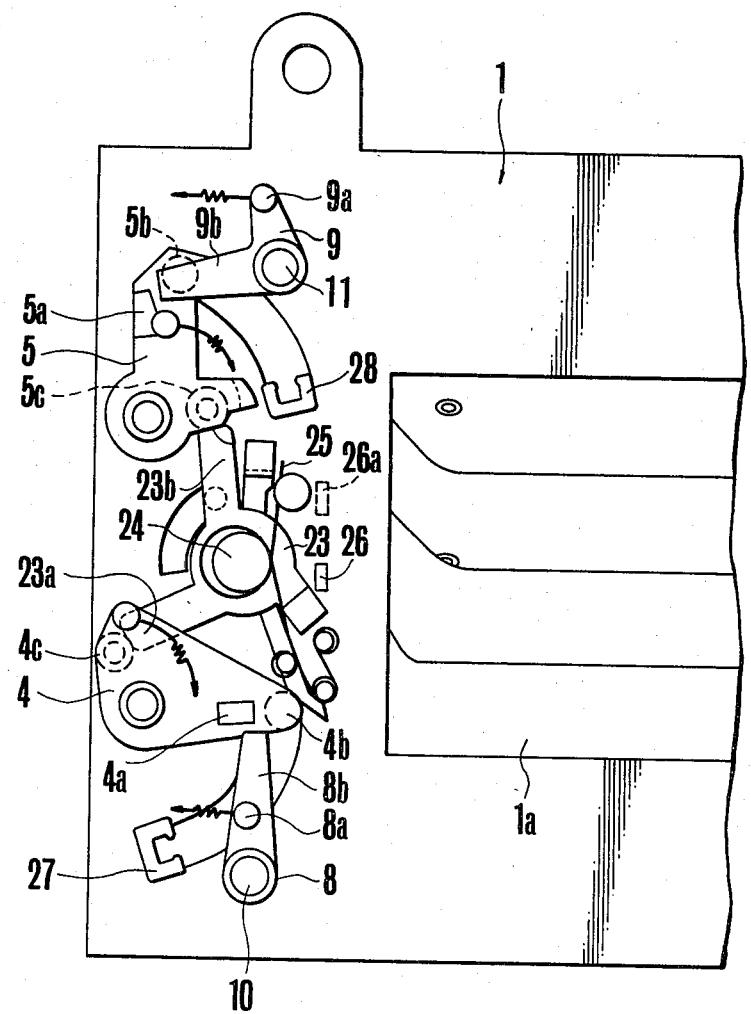
FIG. 2 is a plan view of the same embodiment.

Referring now to FIG. 2, a charge lever 23 which serves a combined purpose as first shutter blade locking member is rotatably mounted on the shutter base plate 1 through a supporting shaft 24. The charge lever 23 is constantly urged by a return spring 25 to rotate counterclockwise as viewed on the illustration of FIG. 2. This charge lever 23 is arranged to be charged by a charge member 26 provided on the camera when the member 26 causes it to rotate clockwise as viewed on FIG. 2. Then, the charge lever 23 is retained in the charged position by the charge member 26.

The clockwise rotation of the charge lever 23 brings the arms 23a and 23b thereof into engagement respectively with the charge pin 4c provided on the front blade driving lever 4 and the charge pin 5c provided on the rear blade driving lever 5 to cause thereby the front and rear blade driving levers 4 and 5 to rotate counterclockwise respectively until they are locked in a condition as shown in FIG. 2. The locking forces exerted on the pins 4c and 5c by the arms 23a and 23b are set stronger than the locking forces exerted on the above stated protrudent portions 4a and 5a by the protrudent portions 8b and 9b.

Further, the charge member 26 serves a combined purpose as a first releasing member and is arranged to return to a position 26a indicated by a dotted line in the drawing after a shutter release button which is not shown but is provided on the outside surface of the camera casing is operated and before the above stated coil 16 is energized. In cases where a known quick return mirror is disposed on a photograph taking optical path, the return movement of the charge member 26 may be arranged to take place in association with the movement of this mirror to retire from the optical path.

When the charge member 26 has returned to the position 26a, the charge lever 23 is moved clockwise by a spring 25 to release the pins 4c and 5c from the locking action thereof. The embodiment which is arranged as described above operates in the following manner:

Referring further to FIG. 2, with the shutter under a charged condition, the arms 23a and 23b of the charge lever 23 respectively engage the charge pins 4c and 5c to lock and inhibit the front and rear blades from travelling. Under this condition, when a mirror up signal is produced in response to a release signal of the camera, the above mentioned quick return mirror retires to the outside of the optical path. Then, in association with this retiring movement, the charge member 26 moves to the position 26a. This causes the charge lever 23 to be rotated counterclockwise by the return spring 25 to release the charge pins 4c and 5c from the locking actions exerted on them. As a result of this, the front blade driving lever 4 and the rear blade driving lever 5 begin to rotate. After that, however, the front blade driving lever 4 is locked with a light force when its protrudent portion 4a comes to abut on the protrudent portion 8b of the second locking member 8 for the front blade. Meanwhile, the rear blade driving lever 5 is locked also with a light force when its protrudent portion 5a comes to abut on the protrudent portion 9b of the second locking member 9 for the rear blade.

Following this, when a front blade travel signal is produced and the coil 16 of the front blade controlling electromagnet 13 is energized through a known control circuit (not shown), the armature 17 is attracted by the yoke 15 and rotates counterclockwise. Following this rotation of the armature 17, the work portion 17a which serves as second releasing member rotates counterclockwise to come to momentarily abut on the release signal pin 8a of the second locking member 8 for the front blade. The pin 8a is thus pushed under a hammer effect produced by the armature 17. This causes the release signal pin 8a to rotate clockwise, as viewed on the drawing, on the supporting shaft 10. The rotation of the pin 8a disengages the protrudent portion 8b of the second front blade locking member 8 from the protrudent portion 4a of the front blade driving lever 4. The front blade driving lever 4 then begins to rotate clockwise. The rotation of the lever 4 is transmitted through the front blade driving pin 4b to a front blade driving arm which is not shown. The divided blades 3a, 3b, 3c and 3d of the front blade travel to open the exposure window 1a and an exposure begins. After the lapse of a predetermined period of time following the energization of the coil 16 of the front blade controlling electromagnet 13, the coil 19 of the rear blade controlling electromagnet 14 is energized by the exposure control circuit which is not shown. The armature 20 is attracted by the yoke 18. The work portion 20a of the armature 20 then comes to push the release signal pin 9a of the second rear blade locking member 9. Accordingly, the locking member 9 is rotated clockwise. The protrudent portion 5b of the rear blade driving lever 5 is disengaged from the protrudent portion 9b of the second rear blade locking member 9 to allow thereby the divided blades of the rear blade (which are not shown) to begin to travel. With the divided blades of the rear blade allowed to travel, the exposure window 1a is closed and the exposure comes to an end.

When the charge lever 23 is rotated clockwise by the charge member 26 in response to a film winding action of the camera after completion of the exposure, the charge pin 4c of the front blade driving lever 4 comes to abut on the arm 23a of the charge lever 23 and is pushed thereby while the charge pin 5c of the rear blade driving lever 5 also comes to abut on the other arm 23b and is pushed thereby. With the charge pins 4c and 5c thus pushed, the front blade driving lever 4 and the rear blade driving lever 5 are brought back into a shutter charging conditions and are again locked in that condition to complete a shutter charging operation.

As has been described in detail in the foregoing, the shutter according to the present invention is arranged to have shutter blades locked in two steps by means of two locking members, i.e. by the arms provided on the charge lever and by the protrudent portions of the second shutter blade locking members. With this arrangement, the shutter blades will never be unlocked by shocks that may be inflicted on the camera while it is carried, so that the shutter can be prevented without fail from being unintentionally opened. Further, the releasing torque of the shutter blade locking members can be reduced. Therefore, the reliability of shutter operations and stableness of shutter precision can be ensured in accordance with the invention. It is a further advantage of the invention that, since the releasing torque for the locking members to be driven by the electromagnets can be reduced to a great extent, the invented electromagnetic release shutter permits use of small, power saving electromagnets, so that the shutter can be manufactured in a smaller size.

Further, when the electromagnetic release shutter according to the invention is used in a motor-drive incorporating camera or the like that is to be carried with the shutter kept in a charged state, the arrangement of the invention effectively prevents the shutter from being opened by shocks. A greater practical advantage of the invention, therefore, can be expected from applications thereof to such cameras.

While specific embodiments of the invention have been shown and described in detail to illustrate the application of the inventive principles, it will be understood that the invention may be embodied otherwise without departing from such principles.

What is claimed is:

1. An electromagnetic release shutter for a camera having shutter blades locked by locking members in a charged state and being arranged to expose a light-sensitive face to light by unlocking the shutter blades through the actions of electromagnets, comprising:
(a) first locking members, said members being capable of locking shutter blades in a charged state;
(b) a first releasing member, said member being capable of releasing said shutter blades from their states of being locked by said first locking members;
(c) second locking members, said members being capable of locking said shutter blades in a charged state; and
(d) second releasing members arranged in combination with electromagnets, said members being capable of releasing said shutter blades by electromagnetic forces from their states of being locked by the second locking members to permit the shutter blades to travel, said second releasing members being arranged to be actuated after the shutter blades are released by the first releasing member from their states of being locked by the first locking members;

said second releasing members being armatures of electromagnets, said armatures being arranged to be driven by the electromagnets and to hit said second locking members after they have been displaced by the electromagnets to predetermined extents.

2. A shutter according to claim 1, wherein the locking force of said first locking members is arranged to be greater than that of the second locking members.

3. A shutter according to claim 1, wherein the release by said first releasing member is arranged to be effected during a period after the start of a shutter releasing operation and before the shutter blades begin to travel.

4. A shutter according to claim 3, wherein said camera has an optical path leading to said light sensitive face with a mirror arranged on the optical path to guide an object's image to be photographed to a view finder and to retire from the optical path immediately before a start of the travel of the shutter; and wherein said first releasing member is arranged to operate in association with said retirement of said mirror.

5. A shutter according to claim 1, wherein said second locking members are disposed at short distances away from the locking positions of said first locking members.

6. A shutter according to claim 1, wherein said first locking members are arranged to serve also as charging members.

7. An electromagnetic release shutter for a camera having shutter blades locked by locking members in a charged state and being arranged to expose a light-sensitive face to light by unlocking the shutter blades through the action of an electromagnet; comprising:
(a) a shutter charging member which is arranged to charge the shutter and also to lock the shutter in the charged state;
(b) a charge releasing member arranged to release the shutter from the charged state in which the shutter is locked by the shutter charging member, said charge releasing member being arranged to perform the charge releasing action after the start of a shutter releasing operation and before the shutter begins to travel;
(c) a second locking member arranged to be capable of locking the shutter in a charged state; and
(d) a second releasing member arranged in combination with an electromagnet, said member being capable of releasing the shutter by an electromagnetic force from its state of being locked by the second locking member to permit the shutter to travel, said second releasing member being arranged to be actuated after the shutter is released by the charge releasing member from its state of being locked by said shutter charging member;

said second releasing member being an armature of said electromagnet, said armature being arranged to be driven by said electromagnet and to hit said second locking member after the second releasing member is displaced by the electromagnet to a predetermined extent.

8. A shutter according to claim 7, wherein the locking force of said shutter charging member is arranged to be greater than that of the second locking member.

9. A shutter according to claim 7, wherein said camera has an optical path leading to said light sensitive face with a mirror arranged on the optical path to guide an object's image to be photographed to a view finder and to retire from the optical path immediately before a start of the travel of the shutter; and wherein said charge releasing member is arranged to operate in association with said retirement of said mirror.

10. A shutter according to claim 7, wherein said second locking member is disposed at a short distance away from the locking position of said shutter charging member.

* * * * *

UNITED STATES PATENT OFFICE
CERTIFICATE OF CORRECTION

Patent No. 4,364,654          Dated December 21, 1982

Inventor(s) Michio Senuma, et al

It is certified that error appears in the above-identified patent and that said Letters Patent are hereby corrected as shown below:

On the title page Item [75] Inventors should read,

--[75]  Michio Senuma, Tokyo; Fumio Shimada, Kanagawa-ken; Yoshihiro Shigeta, Tokyo; Syuichiro Saito; Hiroshi Aizawa, Both of Kanagawa-Ken; Takehiko Ohniwa, Saitama-Ken, all of Japan --.

On the title page Item [73] Assignee should read,

--[73]  Canon Kabushiki Kaisha and Canon Denshi Kabushiki Kaisha, Tokyo; both of Japan --

Signed and Sealed this

Twenty-second Day of February 1983

[SEAL]

Attest:

GERALD J. MOSSINGHOFF

Attesting Officer    Commissioner of Patents and Trademarks